United States Patent [19]

Uzuka

[11] Patent Number: 4,529,900
[45] Date of Patent: Jul. 16, 1985

[54] BRUSHLESS MOTOR

[75] Inventor: Mitsuo Uzuka, Saitama, Japan

[73] Assignee: Sony Corporation, Tokyo, Japan

[21] Appl. No.: 57,120

[22] Filed: Jul. 12, 1979

[30] Foreign Application Priority Data

Jul. 29, 1978 [JP] Japan ................................. 53-92822

[51] Int. Cl.³ .............................................. H02K 1/04
[52] U.S. Cl. ........................................ 310/43; 310/67;
310/266; 310/156
[58] Field of Search ................ 310/67, 156, 766, 68 R,
310/46, 66, 43

[56] References Cited

U.S. PATENT DOCUMENTS

| 3,231,770 | 1/1966 | Hyde | 310/156 |
|---|---|---|---|
| 4,074,157 | 2/1970 | Lace | 310/67 |
| 4,082,970 | 4/1978 | Girardin | 310/266 X |
| 4,099,077 | 7/1978 | Maekawa | 310/266 X |
| 4,115,715 | 9/1978 | Müller | 310/67 |
| 4,143,288 | 3/1979 | Sato | 310/268 |
| 4,185,215 | 1/1980 | Montagu | 310/266 X |

FOREIGN PATENT DOCUMENTS 971680 2/1959 Fed. Rep. of Germany ...... 310/266

Primary Examiner—Peter S. Wong
Attorney, Agent, or Firm—Lewis H. Eslinger; Alvin Sinderbrand

[57] ABSTRACT

A brushless motor comprising a rotor assembly including a rotor magnet which is formed substantially as a hollow cylinder. In one embodiment, the rotor magnet is molded of synthetic resin and contains magnetic material. A rotor shaft is mechanically coupled to the rotor magnet. A stator assembly includes electromagnetic windings wound upon a core. The core has magnetic poles which are spaced from a surface of the cylindrical wall of the rotor magnet by an air gap. In one example, the rotor magnet is cup-shaped having an end wall which bridges the cylindrical wall so as to have the rotor shaft secured to such end wall. The stator assembly also may include a yoke member formed of magnetically permeable material and spaced from the opposite surface of the cylindrical wall of the rotor magnet, whereby the cylindrical wall of the rotor magnet rotates between the magnetic poles of the stator assembly and the yoke member.

16 Claims, 31 Drawing Figures

BRUSHLESS MOTOR

BACKGROUND OF THE INVENTION

This invention relates to a brushless motor and, more particularly, to a brushless D.C. motor of improved, simplified construction which is dynamically balanced and which, desirably, exhibits a low inertia.

In a typical brushless D.C. motor, a stator assembly is disposed in surrounding relationship to a rotor assembly. The rotor assembly generally is comprised of a rotor magnet having a desirable number of poles; and the stator assembly is formed of electromagnetic windings which are sequentially energized so as to impart a rotary motion to the rotor magnet. In a conventional motor of this design, the rotor magnet usually is a solid cylindrical magnet formed of, for example, a solid cylindrical ceramic ferrite magnet or arc-shaped sections, each section being formed of a ceramic ferrite magnet.

Other types of brushless D.C. motors are known in which the rotor magnet surrounds the stator assembly. This so-called outer-rotor D.C. motor also is comprised of relatively heavy cylindrical ceramic ferrite magnets or arc-shaped ceramic ferrite magnets. These ceramic ferrite magnets are fixed, usually by a suitable adhesive, to the inner surface of a cup-shaped rotor yoke. The rotor yoke, in this motor, is constructed of a material of relatively high magnetic permeability, such as soft steel. Typically, such a cup-shaped rotor yoke is made of soft steel plate. Consequently, because of this design, the rotor assembly is heavy and exhibits a relatively large moment of inertia This is particularly undesirable for those applications in which a motor having a small inertia is to be used.

Another disadvantage of brushless D.C. motors of the aforementioned type, that is, of the type in which the rotor magnet is formed either of a solid cylindrical ceramic ferrite magnet or arc-shaped ceramic magnets, is that various elements of the rotor assembly must be accurately machined so as to be within very small tolerances of a precise dimension in order to insure that the rotor assembly exhibits good rotary dynamic balance. This means that either the magnets, the rotor yoke or various rotary support elements must be manufactured within highly restrained tolerances. This, of course, results in high costs in manufacturing and assembling the brushless D.C. motor.

Further, if the brushless D.C. motor is the outer-rotor type in which the ferrite magnets of the rotor assembly must be secured to the inner surface of the cup-shaped rotor yoke, a relatively high assembly time is required for such a motor. Moreover, in a rotor assembly of this type, the rotational dynamic balance thereof may be readily disturbed. Consequently, after the rotor assembly has been assembled, balancing weights must be added thereto in order to return the assembly to its proper rotary dynamic balance.

Yet another disadvantage of brushless D.C. motors of the aforementioned type is that the overall motor construction becomes relatively complicated, and the size of the motor becomes unduly large, when additional devices are incorporated therein. For example, if a frequency generator, which normally is used to detect the rotary speed of the motor, is to be added, or if a transmission element, such as a pulley or the like, is to be added to the rotary shaft, still additional assembly time is required to manufacture such a motor. Also, the overall motor size and shape may become too large for a desired application, and the overall constructuion of the motor may be unnecessarily complicated.

OBJECTS OF THE INVENTION

Therefore, it is an object of the present invention to provide an improved motor having a rotor assembly which avoids the aforenoted disadvantages and, moreover, exhibits a desirably small moment of inertia.

Another object of this invention is to provide an improved brushless D.C. motor.

A further object of this invention is to provide a brushless D.C. motor of outer-rotor type which, desirably, exhibits a relatively small moment of inertia, maintains relatively good rotary dynamic balance, and can be formed of elements which do not require precise machining within very close tolerances.

An additional object of this invention is to provide an improved motor which can be readily assembled relatively quickly, and which does not require post-assembly adjustment in order to correct for possible disturbances in the rotary dynamic balance thereof.

Yet another object of this invention is to provide an improved brushless D.C. motor which is relatively compact and which is of uncomplicated construction, even if additional elements are provided in such a motor, such as a frequency generator, a transmission element, or the like.

Various other objects, advantages and features of the present invention will become readily apparent from the ensuing detailed description, and the novel features will be particularly pointed out in the appended claims.

SUMMARY OF THE INVENTION

In accordance with the present invention, a brushless motor is provided with a rotor assembly including a rotor magnet formed substantially as a hollow cylinder, and a rotor shaft mechanically coupled to the rotor magnet. In one embodiment, the rotor magnet is molded of synthetic resin containing magnetic material. The rotor magnet may be cup-shaped having an end wall bridging the cylindrical wall thereof and receiving the rotor shaft for mounting the rotor assembly on that shaft. The motor also includes a stator assembly which comprises electromagnetic windings wound upon a core. The core terminates in magnetic poles whose pole faces are spaced from a surface of the cylindrical wall of the rotor magnet by an air gap. In one example, the stator assembly also includes a yoke member which is formed of magnetically permeable material and which is spaced from yet another surface of the cylindrical wall of the rotor magnet. In this example, the cylindrical wall of the rotor magnet rotates between the magnetic pole faces and the yoke member of the stator assembly.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
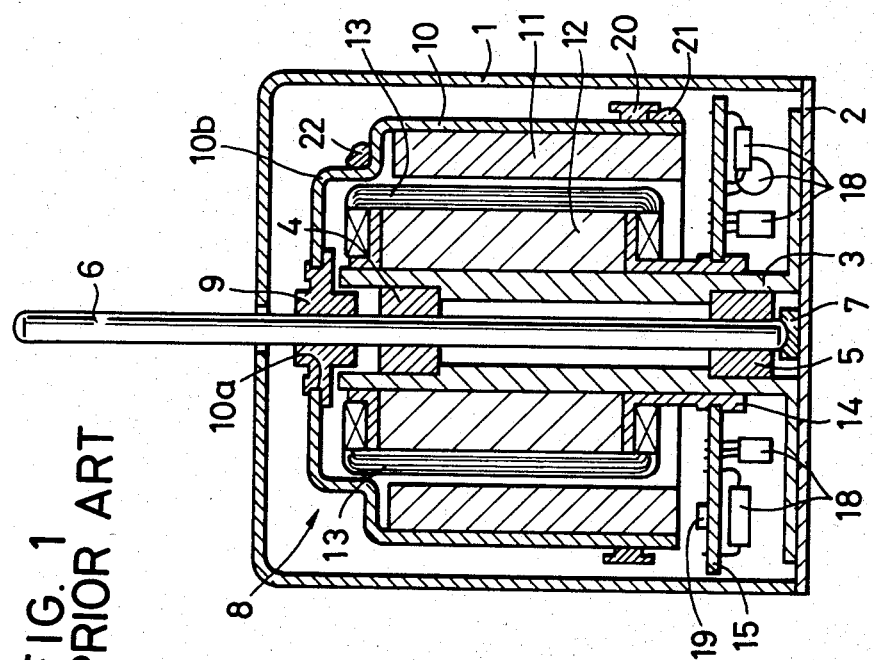
FIG. 1 is a sectional view of a prior art example of a brushless D.C. motor of the outer-rotor type.

Referring now to the drawings, wherein like reference numerals are used to identify like component parts, the advantages attained by the present invention will best be understood by first describing an outer-rotor brushless D.C. motor of the prior art, such as the typical motor shown in FIG. 1. This motor is comprised of a motor housing 1 that is substantially cup-shaped, having a cover plate 2 located at the lower end of the housing, as viewed in FIG. 1. For the purpose of simplification, it will be assumed that the upper portion of the motor is as shown in the upper portion of the figure and, conversely, the lower portion of the motor is as shown in the lower portion of the figure. Of course, it will be readily apparent that the motor may be positioned in any desirable direction when assembled and when in use.

A cylindrical support member 3 having a longitudinal channel therein is mounted on cover plate 2 in, substantially, a centralized location of the cover plate. Bearings 4 and 5 are provided at opposite ends of the longitudinal channel included in cylindrical support members 3, and a shaft 6 is rotated in bearings 4 and 5 and, moreover, is supported on a thrust bearing 7 which, as shown, is secured to the center of cover plate 2.

A rotor assembly 8 is secured to shaft 6 and is formed of a cup-shaped yoke 10 whose end wall supports a boss 9. The boss is secured to shaft 6 such that, as yoke 10 rotates, shaft 6 correspondingly rotates. Cylindrical or arc-shaped permanent magnets 11 are secured to the inner surface of the cylindrical wall of yoke 10. These magnets may be secured to the cylindrical wall by a suitable adhesive, by force-fit, or the like.

The motor shown in FIG. 1 is an outer-rotor motor and, therefore, rotor assembly 8 surrounds and rotates about a stator assembly which is comprised of a cylindrical stator core 12. The core is constructed of material having a relatively high magnetic permeability, such as ceramic ferrite, and is mounted on the outer surface of cylindrical support member 3. Coils 13 are wound about core 12 and, as one example thereof, these coils, or electromagnetic windings, may be arranged as three-phase windings which, of course, are spaced apart from each other by a predetermined angle.

A circuit board 15 is secured to the lower portion of cylindrical support member 3 and contains various motor drive and control circuit elements 18 thereon. Circuit board 15 is insulated from support member 3 by a cylindrical insulator 14. Circuit board 15 also is provided with a position sensing element which is juxtaposed with the rotary path traversed by rotor magnet 11. Sensing element 19 is adapted to generate a signal corresponding to, for example, the changing magnetic flux which is coupled thereto as rotor assembly 8 rotates. This signal, which represents the rotary position of rotor assembly 8, is used to control electrical elements 18 which, in turn, selectively energize electromagnetic windings 13, resulting in the rotation of the illustrated motor.

In the conventional brushless D.C. motor in FIG. 1, yoke 10 is constructed of a material having a high magnetic permeability, such as soft steel iron, in order to reduce the reluctance of the magnetic path in which the rotor is disposed. Because of the material from which yoke 10 must be constructed, rotor assembly 8 is relatively heavy and exhibits a large moment of inertia. These characteristics are undesired for those applications in which a small inertia motor should be provided.

Another disadvantage of the prior art brushless motor shown in FIG. 1 is that, in order to assure good rotational dynamic balance of rotor assembly 8, rotor magnet 11 must be ground, or machined, to within very limited tolerances so as to conform accurately to precise dimensions. Also, yoke 10 must be machined in order to provide proper rotational dynamic balance; and this may be particularly troublesome when a hole 10a is provided in the end wall of yoke 10 in order to receive boss 9 for securing the rotor assembly to shaft 6. Also, since rotor magnets 11 are fixed to the inner surface of the cylindrical wall of yoke 10 by an adhesive or by a force-fit, there is a strong possibility that the rotational dynamic balance of the rotor assembly soon may be disturbed. To account for such a loss in dynamic balance, a ring 20 is secured to, for example, the lower periphery of the cylindrical wall of yoke 10 in order to receive balancing weights 21 which may be needed to restore dynamic balance. As shown in FIG. 1, ring 20 has a T-shaped cross-section; and, generally after the rotor is assembled, weight 21 is forced into the space between ring 20 and yoke 10. As an example, weight 21 may be formed of a lead powder and an adhesive compound. In addition to adding weights 21 to the lower periphery of yoke 10 for dynamic balance, weight 22 may be provided at, for example, the stepped portion 10b at the upper end of yoke 10.

It is appreciated, from the foregoing description of the brushless D.C. motor in FIG. 1, that this prior art motor requires a relatively long assembly time, particularly to adjust rotor assembly 8 for rotational dynamic balance. Also, the securing of rotor magnets 11 to the inner surface of yoke 10 is relatively time-consuming.

Figure 2:
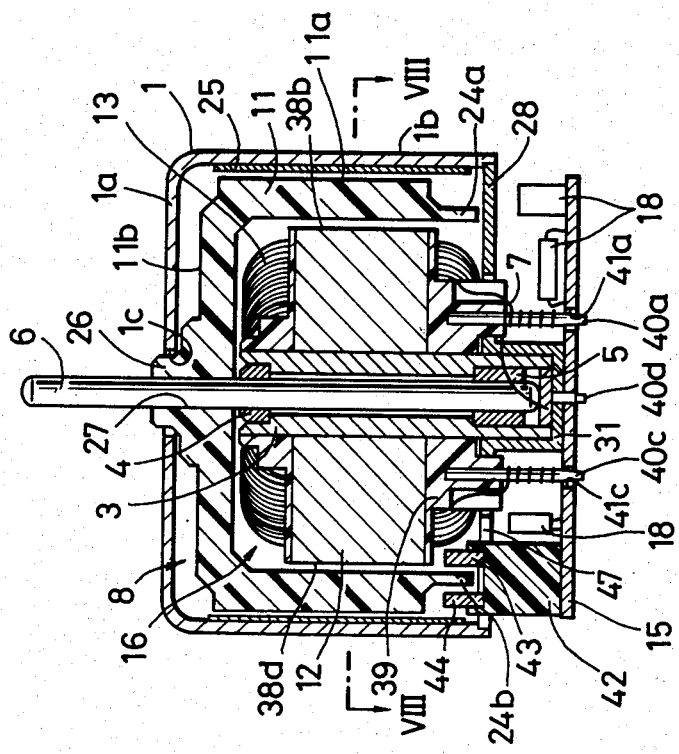
FIG. 2 is a sectional view of one embodiment of a motor in accordance with the present invention.
Figure 3:
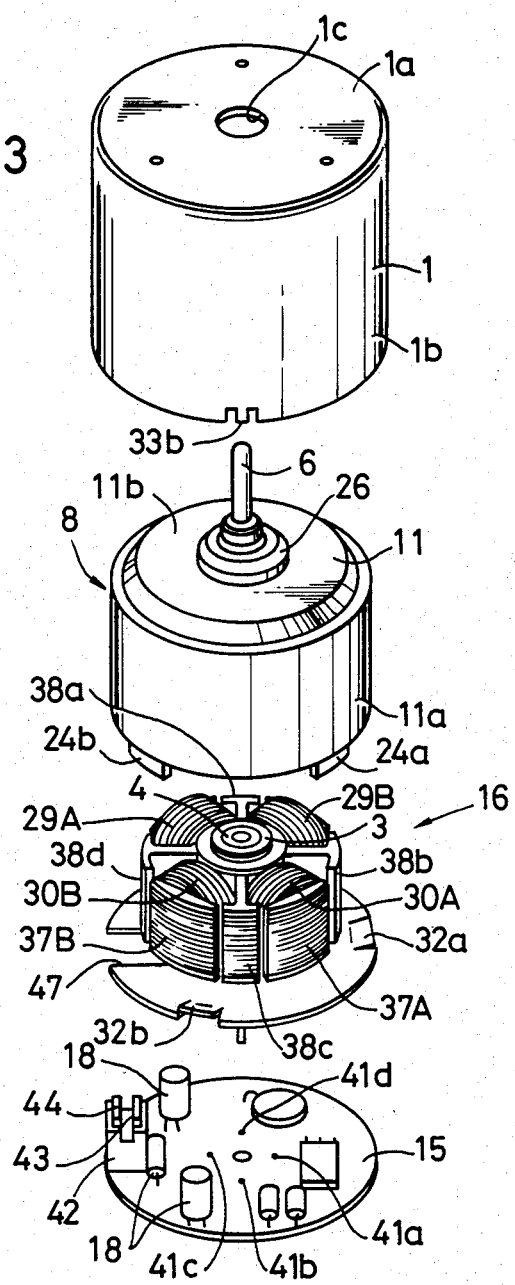
FIG. 3 is an exploded view of the embodiment shown in FIG. 2.

The aforementioned problems associated with the prior art motor shown in FIG. 1 are substantially obviated by the improved motor of the present invention, one embodiment of which is shown in FIGS. 2-9. In a preferred embodiment, the motor of the present invention is a brushless D.C. motor of the outer-rotor type. Those components of the motor of this invention which are substantially similar to the components of the prior art motor shown in FIG. 1 are identified by like reference numerals. Thus, as shown in FIG. 1, a motor housing 1 is provided; and a rotary shaft 6 is secured to rotor assembly 8. As best shown in FIG. 3, the motor of the present invention includes a stator assembly 16 which is circumscribed, or surrounded, by rotor assembly 8 which, in turn, is housed within motor housing 1. Also, a circuit board 15 is provided at the lower end of the motor for supporting the motor control and drive circuitry, whereby rotor assembly 8 is rotatably driven.

Figure 4A:
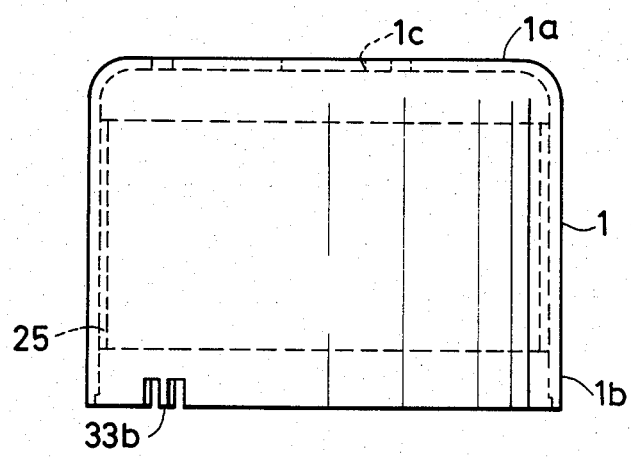
FIGS. 4A and 4B are side and bottom views, respectively, of the motor housing used in the embodiment shown in FIG. 2.
Figure 4B:
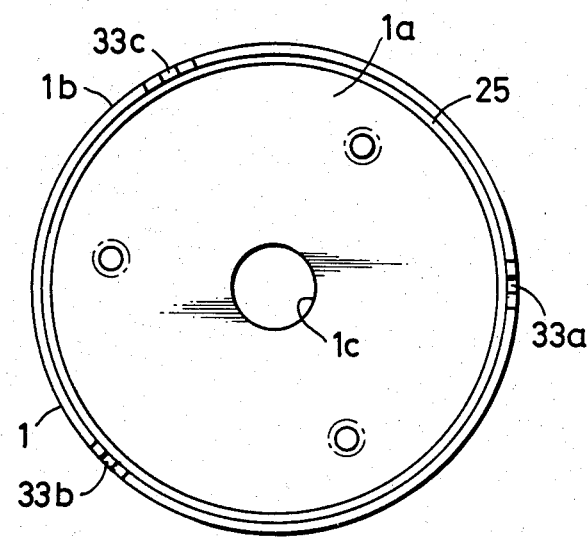

Motor housing 1, shown more particularly in the side and bottom views of FIGS. 4A and 4B, is cup-shaped and is constructed of, for example, soft steel. A central hole 1c is provided in the end wall 1a of motor housing 1, through which rotary shaft 6 projects. A yoke member 25, which may comprise a cylinder formed of magnetically permeable material, is secured to the inner surface of cylindrical wall 1b of motor housing 1. Yoke member 25 may be formed of silicon steel, and may be constructed of a rectangular steel plate which is shaped into desired cylindrical configuration. As an alternative, yoke member 25 may be formed of a strip, or wire, of magnetically permeable material which is wound in a spiral constituted by several turns of such strips or wires. As yet another alternative, yoke member 25 may be a highly permeable ferrite yoke, such as a soft ferrite, or other highly permeable material. It is appreciated that yoke member 25 is stationary and, as shown in FIG. 2, this yoke member is in facing relation to the outer surface of the cylindrical wall of rotor magnet 11, and is spaced from this outer surface by a relatively small air gap.

Rotor assembly 8, shown in FIG. 2, differs from rotor assembly 8 shown in FIG. 1 primarily in that rotor magnet 11 in the FIG. 2 embodiment is not secured to a yoke, such as yoke 10 of FIG. 1. This results in a significant improvement in weight, inertia and rotational dynamic balance of the rotor.

Figure 5A:
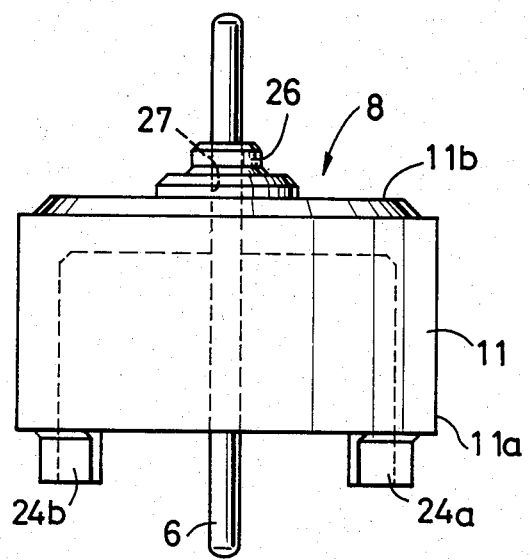
FIGS. 5A and 5B are side and bottom views of the rotor assembly in accordance with an embodiment of the present invention.
Figure 5B:
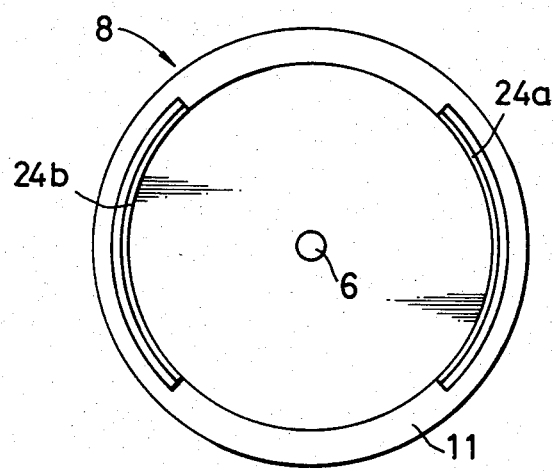

Side and bottom views of rotor assembly 8 are illustrated in FIGS. 5A and 5B, respectively. In the preferred embodiment thereof; rotor magnet 11 is a cup-shaped magnet having a cylindrical wall 11a and an end wall 11b which bridges the cylindrical wall. The magnet may be formed of plastic magnet material which is a mixture of a thermosetting resin or a thermoplastic resin and a ferrite powder. Thus, magnet 11 may be molded of synthetic resin containing magnetic material. As an alternative material from which cup-shpaed rotor magnet 11 may be constructed, a conventional rubber magnetic material can be used.

A boss 26 is provided on end wall 11b and is integrally formed with the material from which rotor magnet 11 is constructed. This boss is provided with a hole 27 to receive shaft 6. Boss 26, and thus rotor magnet 11, is secured to shaft 6 by a force-fit.

The free end of cylindrical wall 11a of rotor magnet 11 terminates in a pair of shutter elements 24a, 24b. Each of these shutter elements, or blades, is arc-shaped and, as shown more clearly in FIG. 5B, is provided on the circumferential edge of the bottom of cylindrical wall 11a. The centers of shutter elements 24a and 24b are spaced apart from each other by 180°. These shutter elements thus are diametrically opposed to each other. Furthermore, each element, or blade, subtends an angle of 90°. The purpose of shutter elements 24a and 24b is to cooperate with a light sensor for the purpose of sensing the particular rotational position of rotor assembly 8.

As shown in FIGS. 2 and 3, a light sensor 42 is mounted upon circuit board 15. This light sensor includes a light source 43, such as a light emitting diode, and a photosensor 44, such as a phototransistor. Light source 43 and photosensor 44 are in optical communication with each other by a light path which spans the distance that separates the light source from the photosensor. The separation between these elements is adapted to receive shutter elements 24a, 24b as rotor assembly 8 rotates, shown more particular in FIG. 2. Thus, when a shutter blade is disposed within the spacing between light source 43 and photosensor 44, light is blocked from impinging upon the photosensor. However, when rotor assembly 8 rotates so as to remove the shutter blade from its light-blocking position, light impinges upon the photosensor, and an indication of the rotary position of the rotor assembly is derivable from the electrical signal that is generated by the photosensor. Thus, it is seen that, as rotor assembly 8 undergoes a 360° rotation, light impinges upon photosensor 44 for a quarter (90°) rotation, light is blocked for another quarter (90°) rotation, light impinges once again for yet another quarter (90°) rotation, and then light is blocked once again for still another quarter (90°) rotation. Hence, in one complete rotation of rotor assembly 8, photosensor 44 is adapted to generate two cycles of a signal.

As shown in FIG. 2, shaft 6 is rotatably supported in bearings 4 and 5 which are provided at opposite ends of the longitudinal channel disposed in cylindrical support member 3, similar to the embodiment shown in FIG. 1. Also, a thrust bearing 7 is provided at the bottom of shaft 6.

Figure 6A:
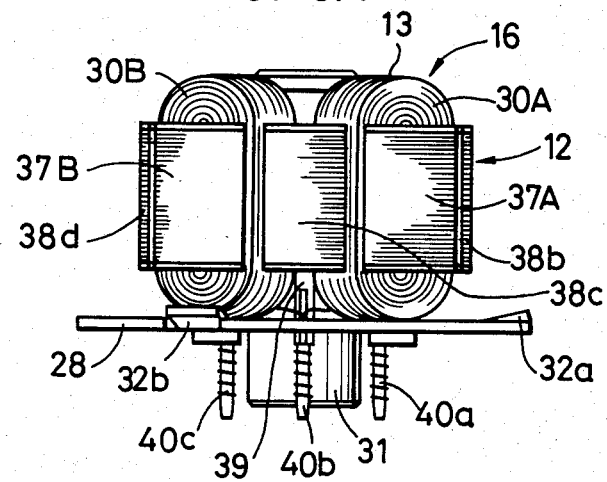
FIGS. 6A and 6B are side and top views of the stator assembly which is used with the present invention.
Figure 6B:
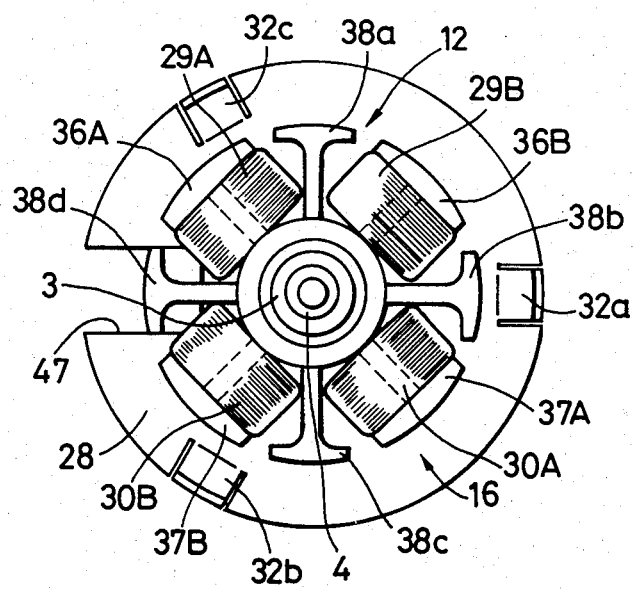

Stator assembly 16 is disposed in the interior of cup-shaped rotor magnet 11. As best seen in FIGS. 3, 6A and 6B, stator assembly 16 includes a base plate 28 having a depending cup 31 in the central portion of the base plate. Cylindrical support member 3 is adapted to be received by cup 31 (FIG. 2). Stator assembly 16 includes a stator core 12 and, in the illustrated embodiment, electromagnetic windings which are formed of two phases of coils. One phase is comprised of series-connected coils 29A and 30A, referred as to the "A-phase"; and the other phase is comprised of series-connected coils 29B and 30B, referred to as the "B-phase". Core 12, which may be a laminated iron core, is secured to the outer surface of cylindrical support member 3. Core 12 is provided with eight poles of salient-pole configuration, as shown in FIG. 6B. Each pole is provided with a radial leg terminating in a pole face. These pole faces are main pole faces 36A and 37A, associated with the A-phase coils, and main pole faces 36B and 37B associated with the B-phase coils. Auxiliary pole faces 38a, 38b, 38c and 38d are connected to core legs which are free of windings. The A-phase and B-phase coils are wound about the legs of the main poles, these windings being accomodated in the slots between adjacent pole legs. Thus, A-phase coil 29A is wound upon the leg associated with main pole face 36A, and A-phase coil 30A is wound upon the leg associated with main pole face 37A. Similarly, B-phase coil 29B is wound upon the leg associated with main pole face 36B, and B-phase coil 30B is wound upon the leg associated with main pole face 37B. The legs of the main poles are spaced apart by 90°; and the main pole faces each subtend an angle of about 50°. The auxiliary pole faces 38a–38d each subtend an angle of about 30°. It is seen that the centers of the coils of a particular phase are spaced apart from each other by 180°. That is, the center of coil 29A is 180° from the center of coil 30A; and, similarly, the center of coil 29B is 180° from the center of coil 30B. A pair of conductors connected to the A-phase coils and another pair of conductors connected to the B-phase coils are connected to suitable-leads, or terminals, on circuit board 15 via terminal rods 40a, 40b, 40c and 40d, as shown in FIGS. 2 and 6A. Preferably, an insulator 39 is provided to insulate the coils from core 12. Terminal rods 40a–40d are mounted axially in insulator 39.

Base plate 28 of stator assembly 16 is a disc plate formed of, for example, steel which may be integral with cup 31. Bent-up portions 32a, 32b and 32c are provided at the periphery of base plate 28, these portions being disposed at intervals of 120°. Bent-up portions 32a–32c are adapted to mate with clips 33a, 33b and 33c, respectively, which are provided at the circumferential edge of motor housing 1, shown in FIG. 3. When the motor is assembled, clips 33a–33c are bent inwardly so as to mate with bent-up portions 32a–32c, respectively, and thus to secure motor housing 1 to base plate 28.

Figure 7:
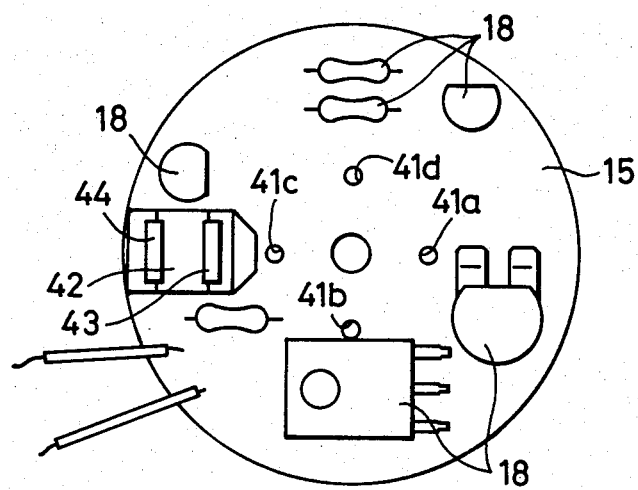
FIG. 7 is a top view of an electronic circuit board which is used to control the operation of the motor in accordance with the present invention.

As shown in FIG. 7, circuit board 15 is provided with holes 41a, 41b, 41c and 41d which, when the motor is assembled, are in alignment with terminal rods 40a, 40b, 40c and 40d, respectively, described above. Thus, in assembly, terminal rods 40a–40d project through holes 41a–41d so as to be electrically connected to various leads which may be provided on the back surface of circuit board 15. This, in turn, provides the appropriate electrical paths by which the A-phase and B-phase coils are energized.

As also shown in FIG. 7, light sensor 42 is provided at a predetermined location on circuit board 15. As will be described below, this location is referred to as a reference position, at 0°. Light sensor 42 extends upwardly through notch 47 of stator base plate 28 (FIG. 6B) so as to receive the shutter blades which are integrally formed at the bottom circumferential edge of rotor magnet 11. It is appreciated that light sensor 42 is disposed in alignment with the center of auxiliary pole face 38d.

Figure 8:
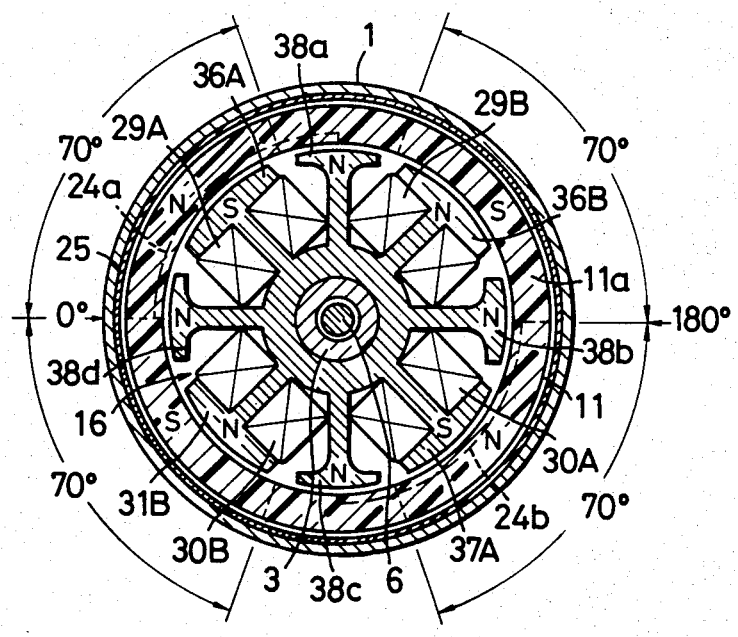
FIG. 8 is a sectional view taken along lines VIII—VIII in FIG. 2.

Referring now to FIG. 8, it is seen that, preferably, rotor magnet 11 is magnetized circumferentially about the cylindrical wall thereof so as to form two pairs of magnetic poles. The first pair of poles is comprised of north and south poles $11N_1$ and $11S_1$, respectively, adjacent each other. Each pole subtends an angle of 70° and, as shown, the boundary between these north and south poles is aligned with the trailing edge (when viewed in the clockwise direction) of shutter blade 24a. This boundary is, for the purpose of the present description, assumed to be rotated to a reference 0° position.

The other pair of magnetic poles which are included in rotor magnet 11 are north and south poles $11N_2$ and $11S_2$, respectively. The boundary between these poles is aligned with the trailing edge of shutter blade 24b. This boundary is diametrically opposed to the boundary defined by north and south poles $11N_1$ and $11S_1$, and is positioned at an angle of 180°. North and south poles $11N_2$ and $11S_2$ are similar to north and south poles $11N_1$ and $11S_1$, and each subtends an angle of 70°. The north poles $11N_1$ and $11N_2$ are seen to be diametrically opposed to each other and, similarly, the south poles $11S_1$ and $11S_2$ also are diametrically opposed to each other. North pole $11N_1$ is spaced from south pole $11S_2$ by an arcuate portion of rotor magnet 11 which is not magnetized. This arcuate portion subtends an angle of 40°. Similarly, north pole $11N_2$ is separated from south pole $11S_1$ by an arcuate portion of the rotor magnet which is not magnetized; this unmagnetized arcuate portion subtending an angle of 40°.

Figure 10A:
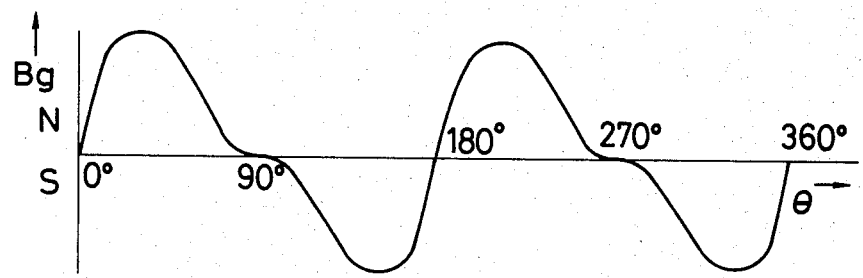
FIGS. 10A–10D are graphical representations of waveforms which are useful in understanding the operation of the present invention.

Referring to FIG. 10A, the magnetic density in the air gap between the pole faces of the stator assembly and rotor magnet 11 is graphically depicted throughout 360° of this air gap. This representation of the magnetic flux distribution is assumed to commence from the reference angle of 0°, and to proceed in the clockwise direction, as viewed in FIG. 8. It is seen that the north and south pole boundaries in each pair of poles at the 0° and 180° positions result in a relatively abrupt change in the polarity of the magnetic flux at those locations. Furthermore, in view of the unmagnetized arcuate portions of rotor magnet 11 which separate the north pole of one pole-pair from the south pole of the other, the flux distribution changes its polarity gradually through these arcuate portions. As shown in FIG. 10A, in the vicinity of the 90° and 270° locations, the magnetic flux distribution is reduced approximately to zero, and the polarity of the flux distribution is seen to change gradually at these locations.

Figure 9:
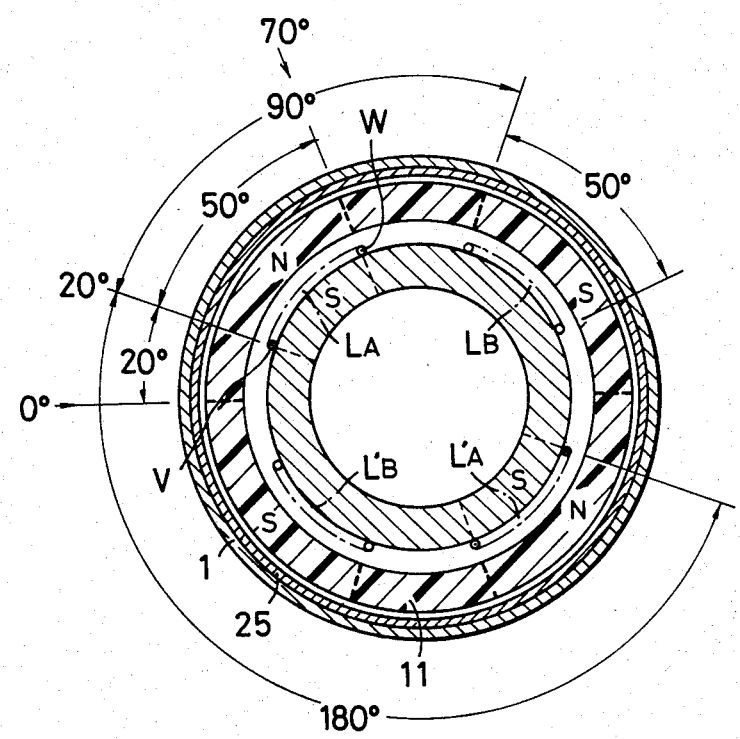
FIG. 9 is a schematic view which is useful in understanding the operation of the present invention.

Let it be assumed that the A-phase coils 29A and 30A are energized. It is assumed, for the purpose of the present discussion, that pole faces 36A and 37A exhibit south pole polarities, as illustrated in FIG. 8. With this assumption, it is appreciated that the other pair of main pole faces 36B and 37B exhibit north pole polarity. It also is assumed that auxiliary pole faces 38a–38d exhibit north pole polarity. The equivalent of this assumed energization of the stator windings is illustrated in FIG. 9. The magnetic flux which is generated by salient main pole faces 36A and 37A is substantially equivalent to the flux which is generated by virtual coils $L_A$ and $L'_A$, shown in FIG. 9. Also, the magnetic flux which is generated by salient main pole faces 36B and 37B is substantially equivalent to the flux generated by virtual coils $L_B$ and $L'_B$. Thus, in the schematic equivalent of FIG. 9, the salient main pole faces are replaced by equivalent virtual coils. This equivalency is confirmed by equivalent magnetic shell theory.

Each virtual coil is provided with a positive current path portion V and with a negative current path portion W. That is, a winding of the virtual coil is assumed to enter the plane of the drawing at V and emerge from this plane at W. The angular extent of each virtual coil, that is, the angular separation between the positive and negative path portions V and W, is about 50°, which is equal to the angle subtended by each main salient pole face shown in FIG. 8. Also, virtual coils $L_A$ and $L'_A$ are the A-phase coils and are diametrically opposed to each other; while virtual coils $L_B$ and $L'_B$ are the B-phase coils and the two are diametrially opposed to each other. The center portion of an A-phase coil is separated by 90° from the center portion of an adjacent B-phase coil.

A rotational torque is exerted on rotor magnet 11 by reason of the flux linkage of the flux from this rotor magnet with the current flowing through the illustrated virtual coils. The equivalent geometric arrangement between the main pole faces of the stator assembly shown in FIG. 8 and the magnetized arcuate segments of rotor magnet 11 results in an angular shift, or displacement, of 20° of the positive path portion V of virtual coil $L_A$ from the 0° position. Now, if virtual coil $L_A$ is energized for a complete 360° rotation of rotor magnet 11, then the rotational torque which is exerted on the rotor magnet by the magnetic flux which links the current flowing through positive path portion V has the waveform shown by curve v in FIG. 10B. The rotational torque derived from the current flowing through positive path portion V of virtual path $L_A$ is seen to be substantially similar to the flux distribution of FIG. 10A, and phase-shifted to the left (i.e., phase advanced) by 20°.

Figure 10B:
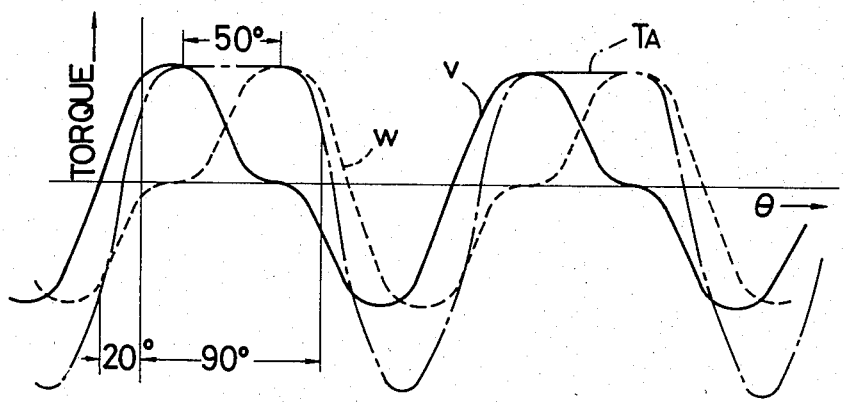

The rotational torque exerted on rotor magnet 11 due to the current flowing through the negative path portion W of virtual coil $L_A$ through a complete 360° rotation is represented by broken curve w of FIG. 10B. It is seen that torque curve w is an inverted version of torque curve v and, moreover, is phase-shifted to the left (i.e., phase-advanced) by 50°. This 50° phase shift is, of course, due to the fact that, as shown in FIG. 9, negative path portion W of virtual coil $L_A$ leads positive path portion V by 50°.

The total torque which is exerted on rotor magnet 11 when virtual coil $L_A$ is energized for a complete 360° rotation is equal to the sum of positive torque curve v and negative torque curve w. This sum, that is, the total torque due to the 360° energization of coil $L_A$, is shown by the dot-dash curve $T_A$ of FIG. 10B. It is appreciated that the positive torque of curve $T_A$ is substantially trapezoidal, and subsists for a range that is in excess of 90°. Since, in the present example, the stator assembly is provided with two pairs of poles, this 90° geometric angle is equal to 180 electrical degrees. Torque curve $T_A$ represents the total torque which is generated by the A-phase virtual coil $L_A$. The torque generated by B-phase virtual coil $L_B$ is of a similar waveform as curve $T_A$, and is phase-shifted to the right by 90° relative to curve $T_A$.

Figure 10C:
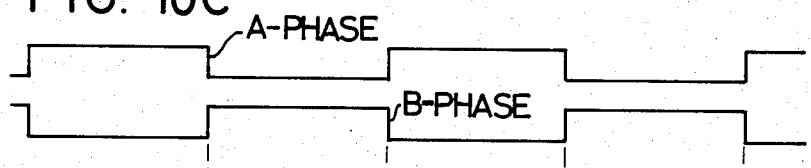
Figure 10D:
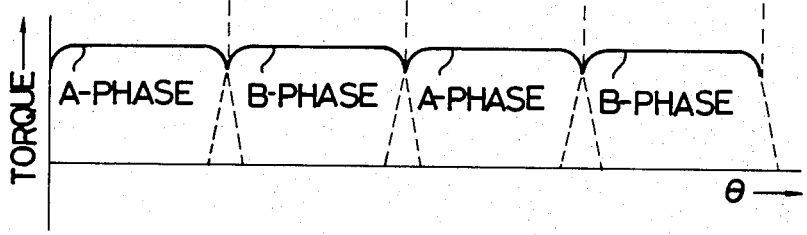

FIG. 10C represents the energizing current waveforms which are used to energize the A-phase and B-phase coils. It is appreciated that the A-phase and B-phase coils are energized alternately, and each phase is energized twice during a 360° rotation. Furthermore, each phase is energized for 90° which, as shown in FIG. 10B, is well within the positive torque range for that phase. The resultant overall torque which is exerted on rotor magnet 11 by the A-phase coils 29A, 30A and by the B-phase coils 29B, 30B, when these phases are energized alternately in the manner represented by FIG. 10C is shown in FIG. 10D. FIG. 10D represents the combination of the torque generated when the A-phase coils are energized alternately with the energization of the B-phase coils. It is recognized that each phase is energized only when the torque produced by the energization of that phase is positive, as shown in FIG. 10B.

The current energizing waveforms shown in FIG. 10C are derived from the rotation of rotor magnet 11 and, more particularly, the passage of shutter blades 24a and 24b through light sensor 42. For example, the A-phase coils are energized when a shutter blade does not block light from impinging upon light detector 44 from light source 43. Conversely, the B-phase coils are energized when a shutter blade is in the optical path between the light source and light detector.

Figure 11:
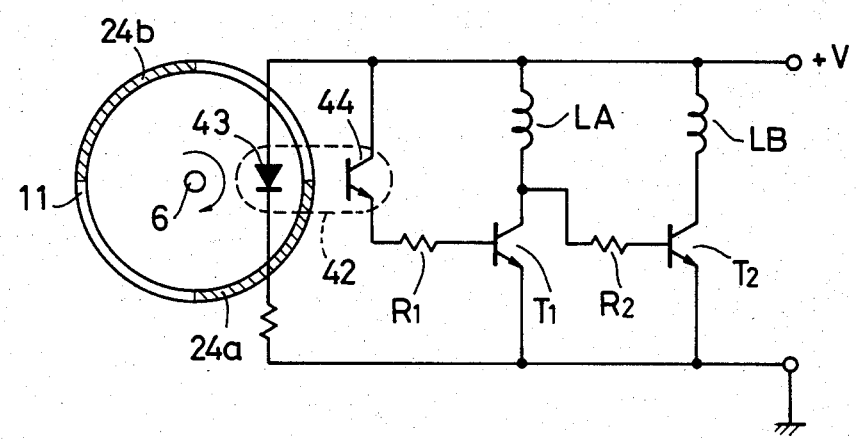
FIG. 11 is a schematic diagram of one embodiment of a motor drive circuit which can be used with the motor of the present invention.

Turning now to FIG. 11, there is illustrated one embodiment of an energizing circuit which can be used, in cooperation with light sensor 42, to selectively energize the A-phase windings and the B-phase windings. The energizing circuit is comprised of drive transistors $T_1$ and $T_2$ whose collector-emitter circuits are connected in series with the A-phase and B-phase windings, respectively. In FIG. 11, the A-phase windings, which are formed of coils 29A and 30A, are represented as winding LA; and the B-phase windings, which are formed of coils 29B and 30B, are represented as winding LB. The base electrode of transistor $T_1$ is coupled via a resistor $R_1$ to light detector 44, shown as a phototransistor. The base electrode of transistor $T_2$ is coupled to the collector electrode of transistor $T_1$ via a resistor $R_2$. A source of operating potential $+V$ is connected to phototransistor 44, and also to windings LA and LB.

In operation, light emitted by light source 43, shown as a light emitting diode, impinges upon phototransistor 44 when shutter blades 24a and 24b are rotated out of the optical path between the light emitting diode and the phototransistor. When light impinges upon phototransistor 44, it is rendered conductive so as to supply a base current via resistor $R_1$ to transistor $T_1$. This base current renders transistor $T_1$ conductive such that energizing current flows through windings $L_A$. When transistor $T_1$ is conductive, the voltage at the collector thereof is reduced so as to render transistor $T_2$ non-conductive.

As rotor magnet 11 continues to rotate, such as represented by the arrow shown in FIG. 11. a shutter blade, such as shutter blade 24b, rotates into the optical path between light emitting diode 43 and phototransistor 44, thus blocking light from impinging upon the phototransistor. The phototransistor is, therefore, rendered non-conductive and, similarly, transistor $T_1$ is non-conductive. This interrupts the energizing current flowing through A-phase winding LA. The collector voltage of transistor $T_1$ now increases so as to supply base current through resistor $R_2$ to transistor $T_2$ Transistor $T_2$ now is rendered conductive so as to enable energizing current to flow through B-phase winding LB.

Thus, it is seen that, as rotor magnet 11 rotates, transistors $T_1$ and $T_2$ are rendered conductive alternately so as to energize the A-phase and B-phase windings LA and LB, respectively, in an alternate manner, as represented by the waveforms shown in FIG. 10C. Each winding is energized for a duration of 90°, whereby each winding is energized twice for each rotation of the rotor magnet.

Figure 12:
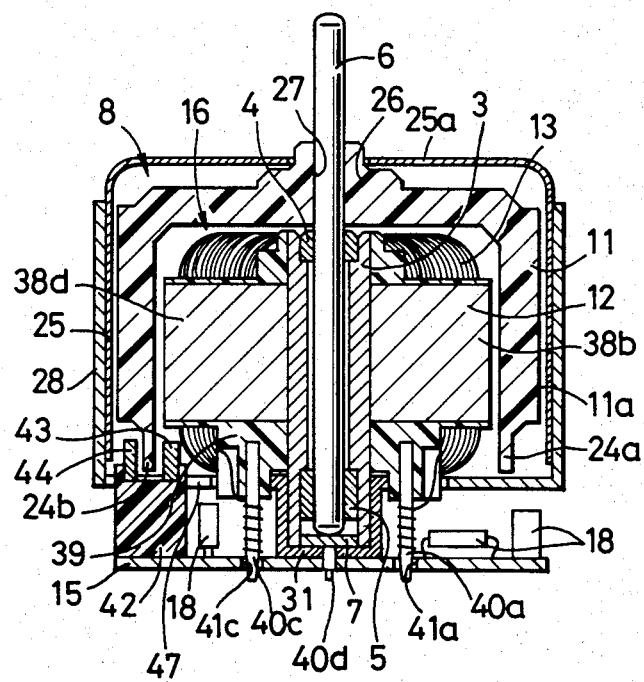
FIG. 12 is a sectional view of yet another embodiment of a motor in accordance with the present invention.

In the embodiment of the brushless D.C. motor described above, yoke member 25 of stator assembly 16 is secured to the inner surface of motor housing 1. Another embodiment of this invention is illustrated in FIG. 12. In this embodiment, cover plate 28, which had been provided at the lower, open end of cup-shaped housing 1, now is formed as a cup-shaped member. Cup-shaped member 28 serves, in part, as a housing for the motor. Yoke member 25 also is cup-shaped, and the cylindrical wall of this cup-shaped yoke member is in contact with the inner surface of the cylindrical wall of cup-shaped member 28. As before, yoke member 25 is formed of magnetically permeable material. In the embodiment shown in FIG. 12, cup-shaped member 25 serves, in part, as a housing for the motor. Thus, yoke member 25 and cup-shaped member 28 cooperate to provide a casing for the illustrated motor. Since cup-shaped yoke member 25 serves, in part, as the motor housing, it effectively reduces leakage magnetic flux which may emanate from the motor and which could be undesirable in various applications of the motor.

Figure 13:
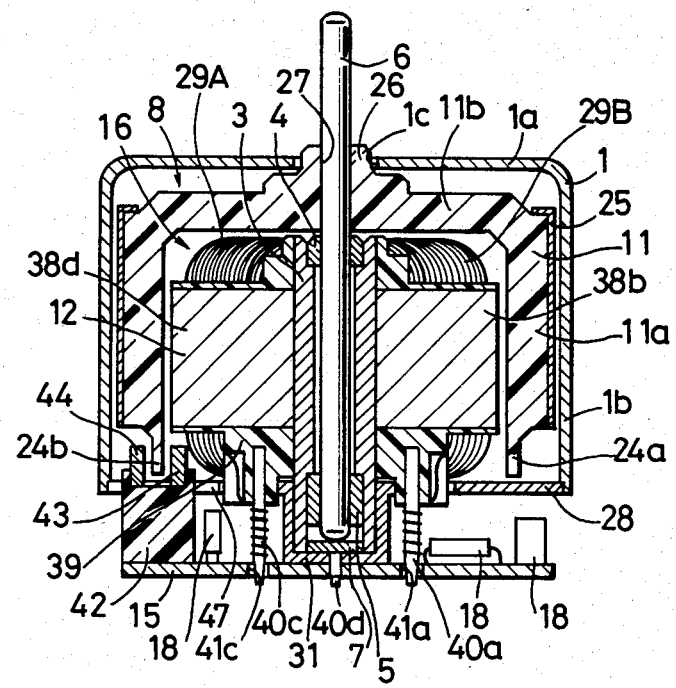
FIG. 13 is a sectional view of still another embodiment of a motor in accordance with the present invention.

Yet another embodiment of the motor described hereinabove is illustrated in FIG. 13. In this illustrated embodiment, yoke member 25 is secured to the outer surface of the cylindrical wall of rotor magnet 11. Yoke member 25 may be formed of a silicon steel plate, as mentioned above with respect to the embodiment of FIG. 2, and may be secured to rotor magnet 11 by a suitable adhesive. As an alternative, yoke member 25 may be formed of material having a high permeability, such as a soft ferrite, or other sintered material. Such high permeability material may be secured to rotor magnet 11 by a force fit. The embodiment of FIG. 13 differs from the prior art brushless motor shown in FIG. 1 in that yoke member 25 is not used as a supportive structure for the rotor assembly as is the prior art yoke 10. Thus, although yoke 10 may require a high mechanical strength in order to carry out its supportive function, this is not necessary for yoke member 25 Consequently, yoke member 25 maybe of light weight and may be relatively thin. Hence, the moment of inertia of the rotor assembly shown in FIG. 13 is relatively low, particularly as compared to the moment of inertia of the rotor assembly shown in FIG. 1. The motor of FIG. 13 thus, desirably, is a low inertia motor.

Figure 14:
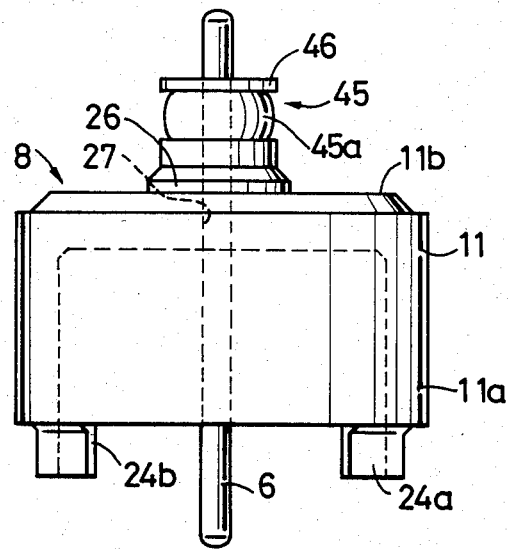
FIG. 14 is a side view of another embodiment of the rotor assembly which can be used with the present invention.

Rotor magnet 11, shown in FIG. 5A, may exhibit the alternative construction shown in FIG. 14. In FIG. 14, boss 26 is further provided with a transmission member 45 by which the rotory torque developed by rotor magnet 11 may be transmitted to a driven device. Transmission member 45 may comprise a pulley having a flange 46 and a contact surface 45a by which a suitable drive belt, or cable, may be deployed thereabout. If rotor magnet 11 is molded of a synthetic resin, transmission member 45 may be molded integrally therewith of the same material. Contact surface 45a may exhibit any desirable shape for cooperating with the drive belt deployed thereabout. As a further alternative, transmission member 45 may comprise a spur gear, a helical gear, a cam or other conventional transmission device other than the illustrated pulley. Such devices may be molded to be integral with boss 26. As yet another alternative, transmission member 45 may take the form of a worm gear which is provided on boss 26 by insert molding.

Figure 15:
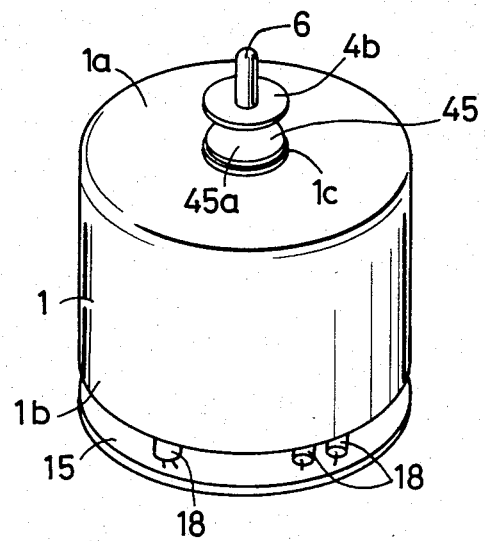
FIG. 15 is a perspective view of the motor having the rotor assembly shown in FIG. 14.

FIG. 15 is a perspective view of the brushless D.C. motor in which rotor magnet 11, having the embodiment shown in FIG. 14, is encased within cup-shaped motor housing 1.

Figure 16:
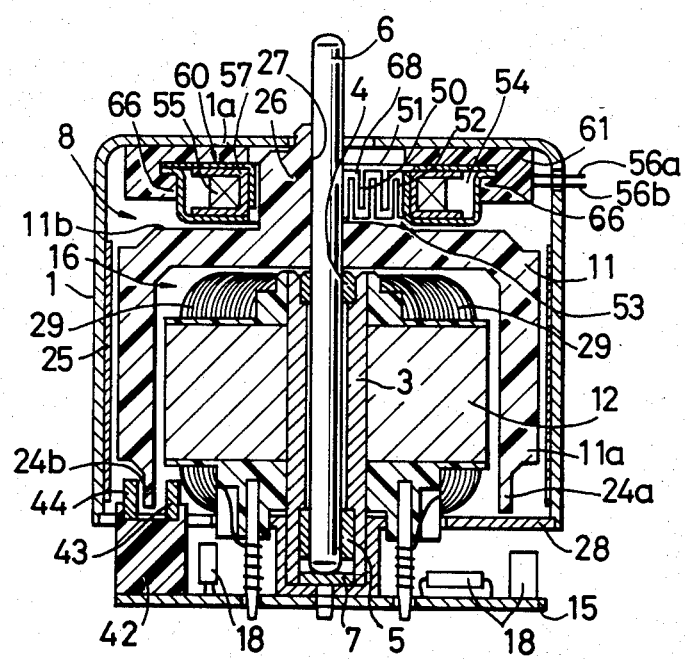
FIG. 16 is a sectional view of an embodiment of the motor in accordance with the present invention, including a frequency generator incorporated therein.
Figure 18:
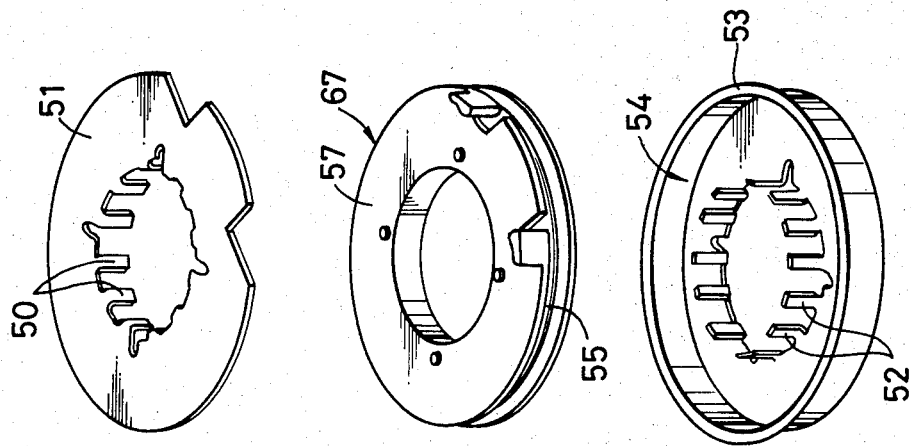
FIG. 18 is an exploded view of a portion of the frequency generator which is used in the motor of FIG. 16.
Figure 17:
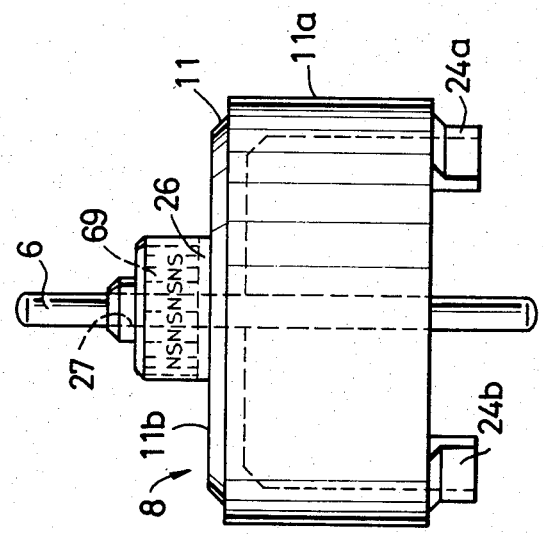
FIG. 17 is a side view of the rotor assembly which can be used in the motor shown in FIG. 16.

FIGS. 16–18 illustrate a modification of the brushless motor shown in FIG. 2 in which a frequency generator is provided. The frequency generator is comprised of a series of alternating north and south poles 69, as shown in FIG. 17, disposed circumferentially about boss 26 on rotor magnet 11. This alternating series of magnetic poles 69 may be formed integrally with rotor magnet 11. Alternatively, individual magnetic pole elements may be arranged on the periphery of boss 26. In either embodiment, as rotor magnet 11 rotates, the alternating series of poles 69 correspondingly rotate.

A detector assembly 60 is secured to the inner surface of top wall 1a of motor housing 1 and is adapted to detect the rotation of poles 69 and to generate a signal whose frequency varies with this rotation. Detector assembly 60 is comprised of an annular support member 61 which, when the motor is assembled, circumscribes boss 26 of rotor magnet 11. Support member 61 is provided with a plurality of elastic clips 66 which project radially inward toward the axis of the motor. The frequency detector, shown in the exploded view of FIG. 18, is secured to support assembly 61 by elastic clips 66.

The frequency detector is comprised of an upper yoke 51 and a lower yoke 54. Each of these yokes is formed of material having a relatively high magnetic permeability, such as soft iron. A plurality of depending teeth 50 are punched from yoke 51 and are disposed in a circular array about a central opening. Similarly, a plurality of upstanding teeth 52 are punched from lower yoke 54 and also are arranged in a circular array about a central opening of the lower yoke. Lower yoke 54 includes a flange 53 upon which upper yoke 51 seats when assembled. When the upper yoke is seated upon flange 53 of the lower yoke, teeth 50 and 52 are interleaved so as to define a cylindrical surface. Such interleaved teeth are spaced from each other by relatively small air gaps.

An annular pick-up coil assembly 67 is disposed in lower yoke 54 so as to surround teeth 52. Pick-up coil assembly 67 is comprised of a coil 55 wound about a bobbin 57. FIG. 16 is a sectional view of frequency detector 60 when assembled. Thus, alternating poles 69 provided on boss 26 are seen to pass within the central opening of lower yoke 54, pick-up coil assembly 67 and upper yoke 51. A magnetic path is formed by upper yoke 51 and lower yoke 54. This magnetic path traverses coil 55 when frequency detector 60 is assembled. Furthermore, air gaps 68 (best seen in FIG. 16) between adjacent teeth 50 and 52 form an open magnetic circuit which is linked by the flux generated from poles 69, whereby a voltage is induced in pick-up coil 55. This voltage varies as a function of the flux linkage which, in turn, varies as poles 69 rotate. The frequency of the induced voltage variations thus is a function of the rotary speed of rotor magnet 11. Output leads 56a and 56b of pick-up coil 55 extend through support member 61 so as to supply this induced voltage to further circuitry.

As rotor magnet 11 rotates, flux from a particular pole of the series of poles 69 passes in one direction in the magnetic path from a tooth 50 of upper yoke 51 to flange 53 of lower yoke 54, and thence to a tooth 52 to return to an adjacent pole 69. This flux path links pick-up coil 55. Thus, as rotor magnet 11 rotates, a voltage having a frequency proportional to the rotary speed of the rotor is induced across the pick-up coil and is supplied to, for example, a speed servo circuit, via lead 56a and 56b.

Figure 19:
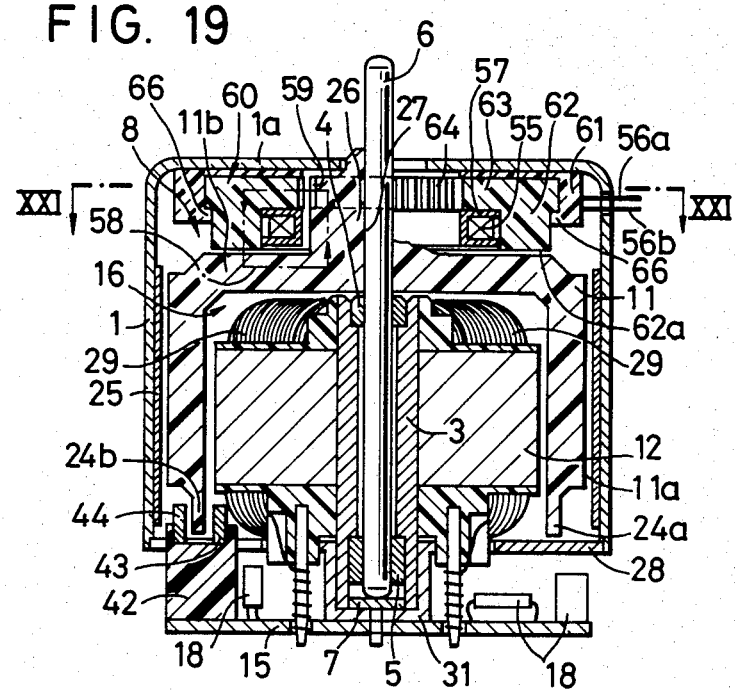
FIG. 19 is a sectional view showing another embodiment of a frequency generator which can be incorporated into the motor of the present invention.
Figure 20:
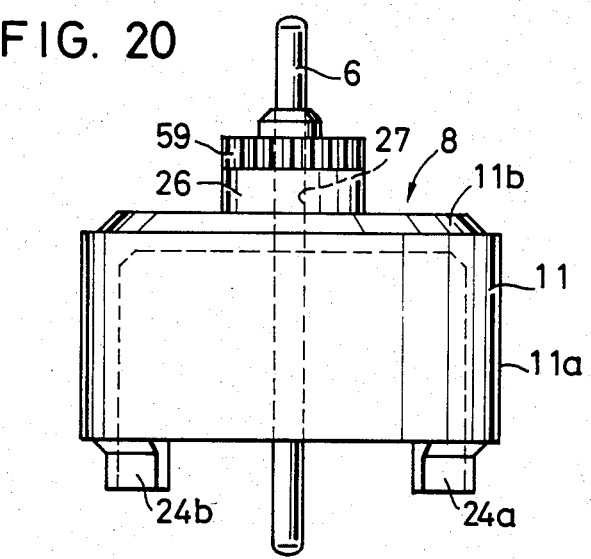
FIG. 20 is a side view of the rotor assembly which is used in the embodiment shown in FIG. 19.
Figure 21:
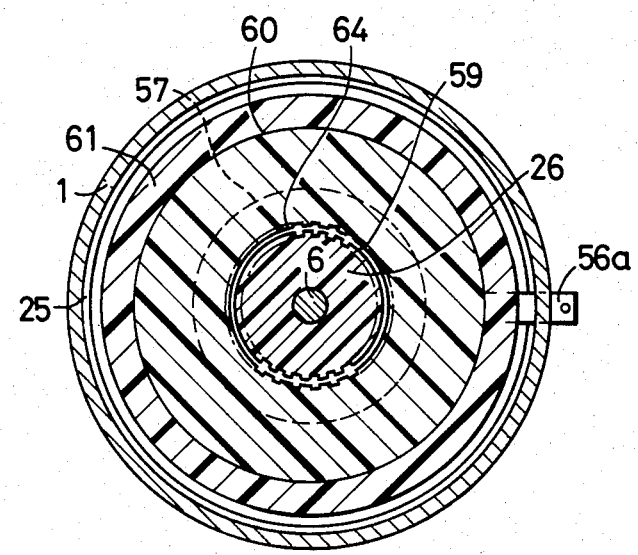
FIG. 21 is a sectional view taken along lines XXI—XXI of FIG. 19.

Another embodiment of a frequency generator which can be used with the motor of the present invention is shown in FIGS. 19–21. The frequency generator of this embodiment is a so-called variable reluctance frequency generator in that a voltage is induced in a pick-up coil of the frequency detector as a function of the changing reluctance in the magnetic path of the frequency generator. The upper portion of boss 26 is provided with a series of spur-like gear teeth 59 disposed about the periphery of the boss. In this embodiment, boss 26, together with gear teeth 59, are formed integrally with rotor magnet 11 and, thus, may be of the same magnetic material As in the aforedescribed embodiment, frequency detector assembly 60 is secured to the inner surface of top wall 1a of motor housing 1. Support member 61 is adhesively attached to the top wall and is provided with elastic clips 66 to receive an annular yoke 62 constructed of material having a relatively high magnetic permeability. Examples of the material from which yoke 62 may be formed are sintered "soft ferrite", or a plastic material including "soft ferrite" powder. The upper portion of annular yoke 62 is provided with a flange 63 which projects radially inward toward the axis of the motor. The inner surface of flange 63 is a cylindrical wall upon which are provided a plurality of spur-like gear teeth 64. Teeth 64 exhibit the same pitch as teeth 59, and the respective sets of teeth are spaced from each other by a relatively small air gap.

Pick-up coil 59, which is wound about bobbin 57, is mounted beneath flange 63 of annular yoke 62, as best shown in FIG. 19. Bottom surface 62a of annular yoke 62 is in face-to-face relation with the upper surface of top wall 11b of rotor magnet 11, and is spaced therefrom by a small air gap. In this embodiment, rotor magnet 11 serves as a source of magnetic flux which follows magnetic path 58 extending upwardly through boss 26, radially outward via a tooth 59, across the air gap separating a tooth 59 from a tooth 64 of annular yoke 62, and then through the annular yoke to return to rotor magnet 11, as shown in FIG. 19. This magnetic path links pick-up coil 55 such that as rotor magnet 11 rotates, the air gap separating teeth 59 from teeth 64 changes. This, in turn, changes the reluctance of the magnetic circuit. As the reluctance of the magnetic circuit varies, the flux linking pick-up coil 55 correspondingly varies so as to induce a varying voltage in the pick-up coil. The frequency at which this voltage varies is, of course, proportional to the speed at which rotor magnet 11 rotates. This induced voltage is supplied via leads 56a and 56b to further circuitry (not shown).

In the embodiment shown in FIGS. 19–21, the source of magnetic flux in magnetic path 58 is the axially magnetized boss 26 of rotor magnet 11. As an alternative, boss 26 may be magnetized in the radial direction, whereupon shaft 6 is included in the magnetic circuit. As yet another alternative embodiment, annular yoke 62 may be molded of plastic magnetic material, similar to the synthetic resin containing magnetic material of which rotor magnet 11 is constructed. In such an embodiment, annular yoke 62 serves as a source of magnetic flux for the frequency generator. In a still further alternative embodiment, a separate annular magnet may be provided as the source of magnetic flux which traverses magnetic path 58. In such an alternative embodiment, neither boss 26 nor yoke 62 may be formed of magnetic material. Of course, these elements still should be constructed of magnetically permeable material.

Figure 22:
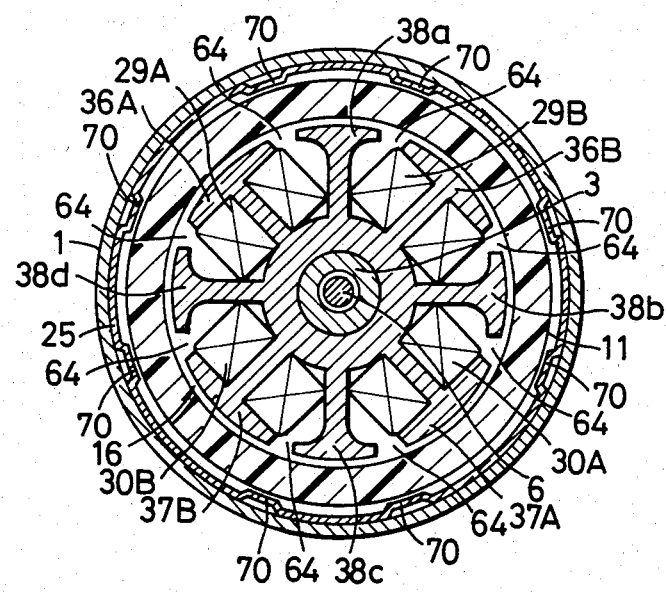
FIG. 22 is a sectional view showing another embodiment of the stator assembly which can be used with the motor of the present invention.
Figure 23:
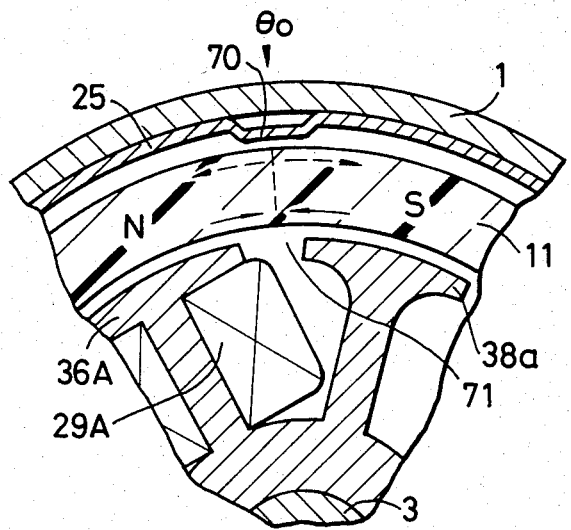
FIG. 23 is an enlarged view of a portion of the stator assembly shown in FIG. 22.

An alternative embodiment of yoke member 25 is illustrated in FIGS. 22 and 23. In this alternative embodiment, the yoke member is provided with projections 70 which extend radially inward toward the axis of the motor. The reason for providing such projections now will be explained.

Figure 24A:
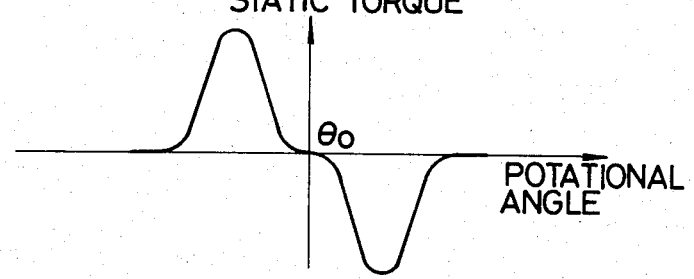
FIGS. 24A–24B are graphical representations of the static torque which is developed by the motor shown in FIG. 22.

In the brushless D.C. motor in which spaces 64 are provided between adjacent main and auxiliary pole faces, it is appreciated that the magnetic reluctance between rotor magnet 11 and the stator assembly increases in the vicinity of such spaces, relative to the magnetic reluctance between the rotor magnet and a pole face. As best shown in FIG. 23, the reluctance in a space 71 between main pole face 36A and auxiliary pole face 38A is greater than the magnetic reluctance at either of these pole faces. As a consequence of this increased magnetic reluctance, when a north-south boundary between north and south poles of rotor magnet 11 rotates into the vicinity of this opening 71, that is, when such a boundary rotates to the illustrated angular position $\theta_o$, the magnetic flux distribution between rotor magnet 11 and the stator assembly is disturbed so as to produce an unsteady rotation or "jerky movement" thereat. That is, there is a tendency of the rotor assembly to halt its rotation, once the stator windings are de-energized, when a north-south boundary of the rotor magnet reaches angular position $\theta_o$. This is due to two relatively small static torques which act oppositely to each other at angular position $\theta_o$ on the north-south boundary of rotor magnet 11. These oppositely acting static torques are represented by the solid arrows in the rotor magnet of FIG. 23. A graphical representation of such static torques is illustrated in FIG. 24A, in which the axis represents the rotational angle of rotor magnet 11, and the origin corresponds to the angular position $\theta_o$. It is seen that to the left of this angle, that is, in the north region of the rotor magnet, a positive static torque is exerted on the rotor magnet; and to the right of this angular position, that is, at the south pole side of the north-south boundary a negative torque is exerted on the rotor magnet. These positive and negative torques are the cause of an unsteady rotation of rotor magnet 11, resulting in vibration or ripple in the motor.

Figure 24B:
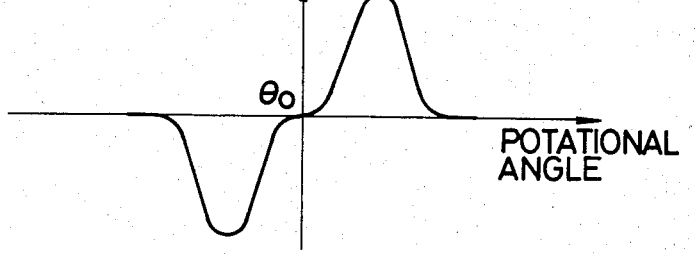

In the embodiment of the stator assembly shown in FIGS. 22 and 23, yoke member 25 is provided with projections 70 which extend radially inward toward the motor axis. As is seen more clearly from FIG. 23, projections 70 are disposed at angular positiona $\theta_o$ so as to be in alignment with the center of each space 71 between a main and an auxiliary pole face. Since projections 70 are integral with yoke member 25, that is, these projections are of the same magnetically permeable material, such radially-inward extending projections compensate for the otherwise increase in reluctance at space 71. Hence, these projections 70 tend to reduce the magnetic reluctance in the vicinity thereof. Such a decrease in magnetic reluctance counterbalances the increase in magnetic reluctance due to spaces 71. Therefore, even though spaces are provided between the main and auxiliary pole faces, a substantially uniform reluctance is provided throughout the rotary path of rotor magnet 11 due to the compensating projections 70 which are provided on yoke member 25. These projections tend to produce the static torque which is graphically depicted in FIG. 24B. The static torque of FIG.

24B is represented by the broken arrows in rotor magnet 11 of FIG. 23. It is appreciated that this static torque, which is due to projections 70, counterbalances the static torque which is due to spaces 71. The static torques of FIGS. 24A and 24B, which are due to the increased and compensating decreased reluctance caused by spaces 71 and projections 70, respectively, cancel each other. Consequently, rotor magnet 11 undergoes a steady rotation, and vibration and ripple of the motor are avoided.

While the present invention has been particularly shown and described with reference to certain preferred embodiments, it will be readily apparent to those of ordinary skill in the art that various changes and modifications in form and details may be made without departing from the spirit and scope of the invention. For example, the brushless D.C. motor which is disclosed herein may be either the outer rotor type or an inner rotor type. Furthermore, the air gap between rotor magnet 11 and the stator assembly need not be limited solely to a radial air gap, as shown in the above-described embodiments. It is contemplated that the present invention is equally applicable to a so-called axial air gap type of brushless D.C. motor in which the rotor and stator assemblies face each other in the axial direction. Still further, the present invention can be used in a synchronous motor, in a tachometer or in other electric machines having a rotational field magnet.

In the aforedescribed embodiments, rotor magnet 11 has been shown as a cup-shaped rotor magnet having an end wall bridging the cylindrical walls and secured to shaft 6. As an alternative, rotor magnet 11 may be a substantially hollow cylinder which is secured to shaft 6 by suitable radially-extending bridge elements.

Although some examples of magnetically permeable material have been specified, it should be apparent that the present invention is not limited only to such examples. Other material having good magnetic permeability can be used as, for example, the core and yoke members of stator assembly 8. Such material generally has a relative permeability $K_m$ ($K_m = \mu/\mu_o$) that is greater than unity.

It is intended that the appended claims be interpreted as including the foregoing as well as various other changes and modifications.

What is claimed is:

1. A brushless D.C. motor comprising a cup-shaped rotor magnet having a cylindrical wall and an end wall integral therewith, said rotor magnet being formed entirely of a synthetic resin which contains magnetic material having north and south magnetic poles circumferentially about said cylindrical wall; a rotor shaft secured to said end wall of said cup-shaped rotor magnet; and a stator assembly rotatably supporting said rotor magnet by said rotor shaft and including electromagnetic windings would upon a fixed core, said core having magnetic poles with faces confronting and spaced from one surface of said cylindrical wall of said cup-shaped rotor magnet, and a fixed yoke member formed of ferromagnetic material and spaced from another surface of said cylindrical wall of said cup-shaped rotor magnet, such that said cylindrical wall is interposed directly between the magnetic pole faces of said core and said yoke member.

2. The motor of claim 1 wherein said rotor magnet is provided with a boss at one end thereof substantially centered on the axis of the rotor shaft, said boss having a hole for receiving said rotor shaft, whereby said rotor magnet is secured to said shaft.

3. The motor of claim 2 wherein said boss is provided with a torque transmission member integral therewith for transmitting torque developed by the rotation of said rotor magnet.

4. The motor of claim 1 further comprising shutter means mounted on said cylindrical wall of said rotor magnet to rotate when said rotor magnet rotates; and photosensing means for sensing the rotation of said shutter means, said photosensing means including a light source and a light detector in optical communication with each other over a light path, said shutter means rotating between said light source and said light detector to interrupt said light path periodically, such that the rotary position of said rotor magnet is detected by said light detector.

5. The motor of claim 4 wherein said shutter means comprises at least one element extending from and integrally formed with said cylindrical wall of said rotor magnet.

6. The motor of claim 4 further comprising a frequency generator mounted on said rotor magnet.

7. The motor of claim 8 wherein said frequency generator comprises a plurality of north and south pole elements arranged alternately about the circumference of a portion of said rotor magnet; and a detector fixed relative to the rotation of said rotor magnet and coaxial with said north and south pole elements, said detector including a plurality of teeth spaced from said north and south pole elements and a pick-up coil disposed in the magnetic path formed by said north and south pole elements and said teeth, such that the magnetic flux produced by said north and south pole elements and following said magnetic path is detected by said pick-up coil, whereby a signal is derivable from said pick-up coil with a frequency determined by the rotary speed of said rotor magnet.

8. The motor of claim 7 wherein said teeth of said detector surround said north and south pole elements, and said pick-up coil circumscribes said teeth.

9. The motor of claim 8 wherein said teeth are formed of material having a relatively high magnetic permeability, said teeth being constituted by first and second sets of interleaved tooth elements.

10. The motor of claim 6 wherein said frequency generator is a variable reluctance frequency generator comprising a plurality of tooth elements arranged circumferentially about a portion of said rotor magnet; a detector fixed relative to the rotation of said rotor magnet and coaxial with said tooth elements, said detector including a plurality of detector teeth spaced from said tooth elements by an air gap and disposed with said tooth elements in a magnetic path and a pick-up coil positioned in said magnetic path; and a source of magnetic flux which follows said magnetic path, such that the reluctance of said magnetic path changes as said rotor magnet rotates to vary the strength of the magnetic flux detected by said pick-up coil, whereby a signal is derivable from said pick-up coil with a frequency determined by the rotary speed of said rotor magnet.

11. The motor of claim 10 wherein said tooth elements are integral with said rotor magnet; and said source of magnetic flux is said rotor magnet.

12. The motor of claim 10 wherein said detector comprises fixed support means for said detector teeth; and said source of magnetic flux comprises magnetic material from which said fixed support means is constructed.

13. The motor of claim 1 wherein said rotor magnet surrounds said electromagnetic windings would upon said core.

14. The motor of claim 1 further comprising a cup-shaped motor housing surrounding said rotor magnet; said yoke member being secured to the inner surface of said motor housing.

15. The motor of claim 1 further comprising a cup-shaped motor housing constructed of magnetically permeable material and surrounding said rotor magnet, said motor housing constituting said yoke member.

16. The motor of claim 1 wherein the magnetic poles of said core comprise legs which terminate in pole faces, said pole faces comprising main pole faces upon whose legs said electromagentic windings are wound and auxiliary pole faces whose legs are free of said electromagnetic windings, said main and auxiliary pole faces alternating circumferentially about the axis of said rotor shaft and being spaced from each other; and said yoke member includes projections aligned with and extending in the direction toward the spaces between said main and auxiliary pole faces to reduce the magnetic reluctance between said rotor magnet and said stator assembly in the vicinity of said projections.

* * * * *